United States Patent [19]
Good

[11] 3,774,266
[45] Nov. 27, 1973

[54] MIXING GLAND FOR STUFFING MEAT DOUGH

[75] Inventor: Paul F. Good, Lutherville Md.

[73] Assignee: Speedco, Inc. Baltimore, Md.

[22] Filed: June 25, 1971

[21] Appl. No.: 156,657

[52] U.S. Cl. .................................. 17/41, 425/461
[51] Int. Cl. .............................................. A22b 5/00
[58] Field of Search ................ 17/41, 35; 425/131, 425/133, 375, 461, 464

[56] References Cited
UNITED STATES PATENTS
2,320,496  7/1943  Weschsler .......................... 425/461
2,619,674  12/1952  Stem ..................................... 17/35
3,303,530  2/1967  Cobb, Jr. ............................ 425/461

*Primary Examiner*—Lucie H. Laudenslager
*Attorney*—Francis D. Stephens et al.

[57] ABSTRACT

A mixing gland positioned at the outlet end of a meat dough stuffing horn having slots for mixing the discharged dough to eliminate defects in finished meat products such as entrapped air pockets, two-tone color differences and swirl impressions.

4 Claims, 3 Drawing Figures

Patented Nov. 27, 1973

3,774,266

INVENTOR

Paul F. Good

MIXING GLAND FOR STUFFING MEAT DOUGH

This invention relates to a mixing gland for use in the outlet end of a stuffing horn for emulsion type meats such as luncheon meats.

It is common practice in the meat processing industry to chop and emulsify meat products such as bologna and then to pump the thus formed meat dough through a stuffing horn into a fibrous casing.

In stuffing meat dough, the flow of the meat through the stuffing horn is such that a certain amount of dough has been overworked and tends to fat-out and, this portion of the dough migrates to the inner wall of the stuffing horn. Because of the laminar flow of the meat dough through the outlet of the horn, a horn ring or swirl of two-tone color difference is impressed in the dough being extruded into the casing. Also, because of the laminar flow, significant entrapped air pockets are allowed to remain in suspension within the meat dough, thus encouraging the formation of fat and jelly pockets during further processing. All of these defects hinder the further processing of the meat product in the processing plant.

In the prior art, the outlet end of the stuffing horn is usually in the form of a so-called mixing gland, which consists of an elongated slot or a tapered gland. In these glands, there is insufficient mixing of the dough as it flows through the gland into the casing. Some stuffing horns have outlet orifices which are slotted entirely through the horn, as shown in Kielsmeier et al., U.S. Pat. No. 3,404,430, for enabling large particles of sausage to migrate towards the inner surface of the sausage casing. Hill, U.S. Pat. No. 2,871,505, shows a horn outlet tapered at its outlet end. None of the prior art disclosures sufficiently mix the meat dough as it is extruded from the horn into the casing.

The object of this invention is to produce a gland for the outlet end of a stuffing horn which mixes the meat dough, flowing at a relatively high velocity, through the gland, so that the overworked unstable dough and entrapped air in the dough is thoroughly mixed.

in general, these objects are obtained by forming a mixing gland which is composed of a body having a conically shaped opening coverging from its inlet end towards its outlet end and having slots in the wall of the outlet portion of the gland which slots are staggered so that no two slots are diametrically opposite to each other.

In general, the objects of this invention are described in detail with reference to the accompanying drawing in which.

Figure 1:
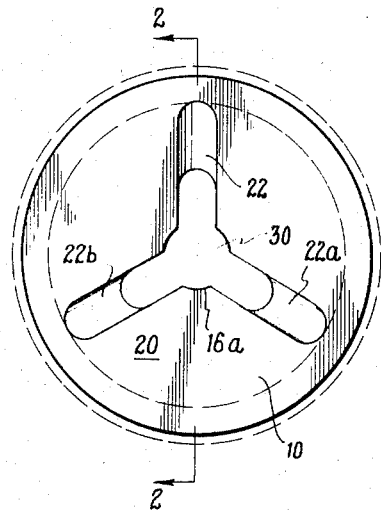
FIG. 1 is an end view of the outlet end of the mixing gland.
Figure 2:
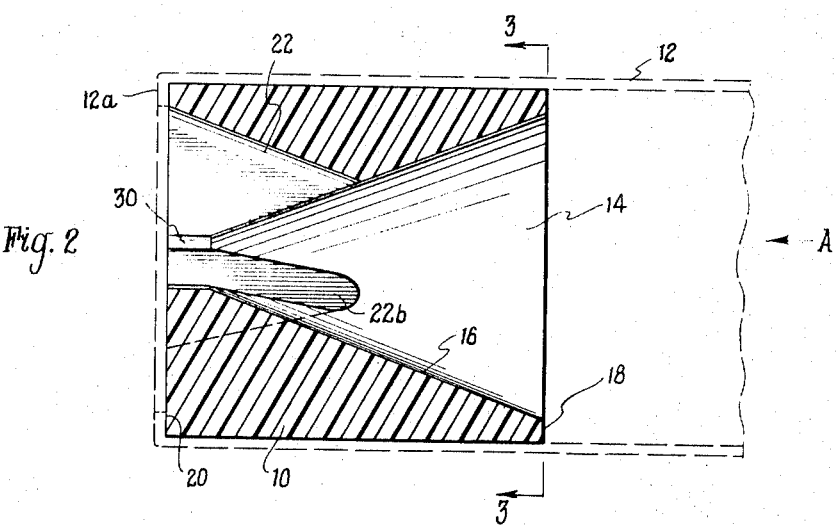
FIG. 2 is a cross-sectional view taken on the line 2—2 of FIG. 1.
Figure 3:
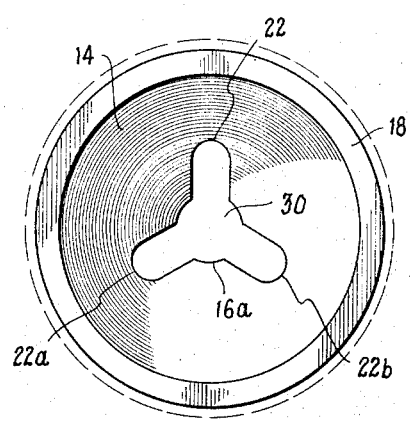
FIG. 3 is a cross-sectional view taken on the line 3—3 of FIG. 1.

The mixing gland is composed of a body 10 adapted to be inserted in the outlet end of a stuffing horn 12, indicated by dashed lines.

the body 10 has axially aligned conical opening 14 therein with its wall 16 converging from its inlet end 18 to the outlet end 20. The outlet end is finished with a partially cylindrical wall 16a. Adjacent the outlet end 20 are a plurality of slots 22, 22a and 22b, formed in the wall 16 and extending from approximately the middle of conical opening 14 through the outlet end 20. These slots 22, 22a and 22b are diametrically offset from one another. One or more slots of the same or different sizes can be used, depending upon the type of dough being processed.

The stuffing horn 12 is indicated as being a conventional cylindrical shape, but is not limited thereto, and the body 10 bears against a periphial horn flange 12a at the outlet end of the horn.

In operation, the meat dough flows through the horn 12 in the direction of the arrow A at a relatively high velocity. Thus, as a portion of the dough flows, for example, along the lower section of the conical surface 16a the portion of the dough particles opposite the lower section are accelerated toward and into the slot 22. In a similar manner, other portions of the dough flow through slots 22a and 22b, such that a general criss-crossing and mixing of the dough particles occur in the central area 30 of the gland. Consequently, the overworked dough and the entrapped air in the dough become thoroughly mixed throughout the cross section of the extruded meat product. The resultant improvement is evidenced when the product is sliced and an absolutely uniform defect free surface is exhibited and also when the meat product is split open longitudinally it exhibits complete homogeneity.

Having now described the means by which the objects of the invention are obtained,

I claim:

1. A mixing gland for mixing a product comprising a body having an inlet end and an outlet end, a passageway defined by a tapering surface extending from the said inlet end to the said outlet end, said passageway gradually diminishing in area from said inlet end toward said outlet end, a plurality of slot means in said generally tapering surface extending to said outlet end of said body, said slot means gradually increasing in cross sectional area along said passageway in the direction of said outlet end of said body.

2. A gland as in claim 1, in which said slot means extends about one-half the length of said body.

3. A mixing gland as in claim 1, said slot means having a wall that diverges outwardly toward the outer surface of said body at the outlet end of said body.

4. A gland as in claim 1, in which said slot means comprises an odd number of non-diametrical slots in said wall adjacent said outlet end.

* * * * *